Patented Aug. 7, 1928.

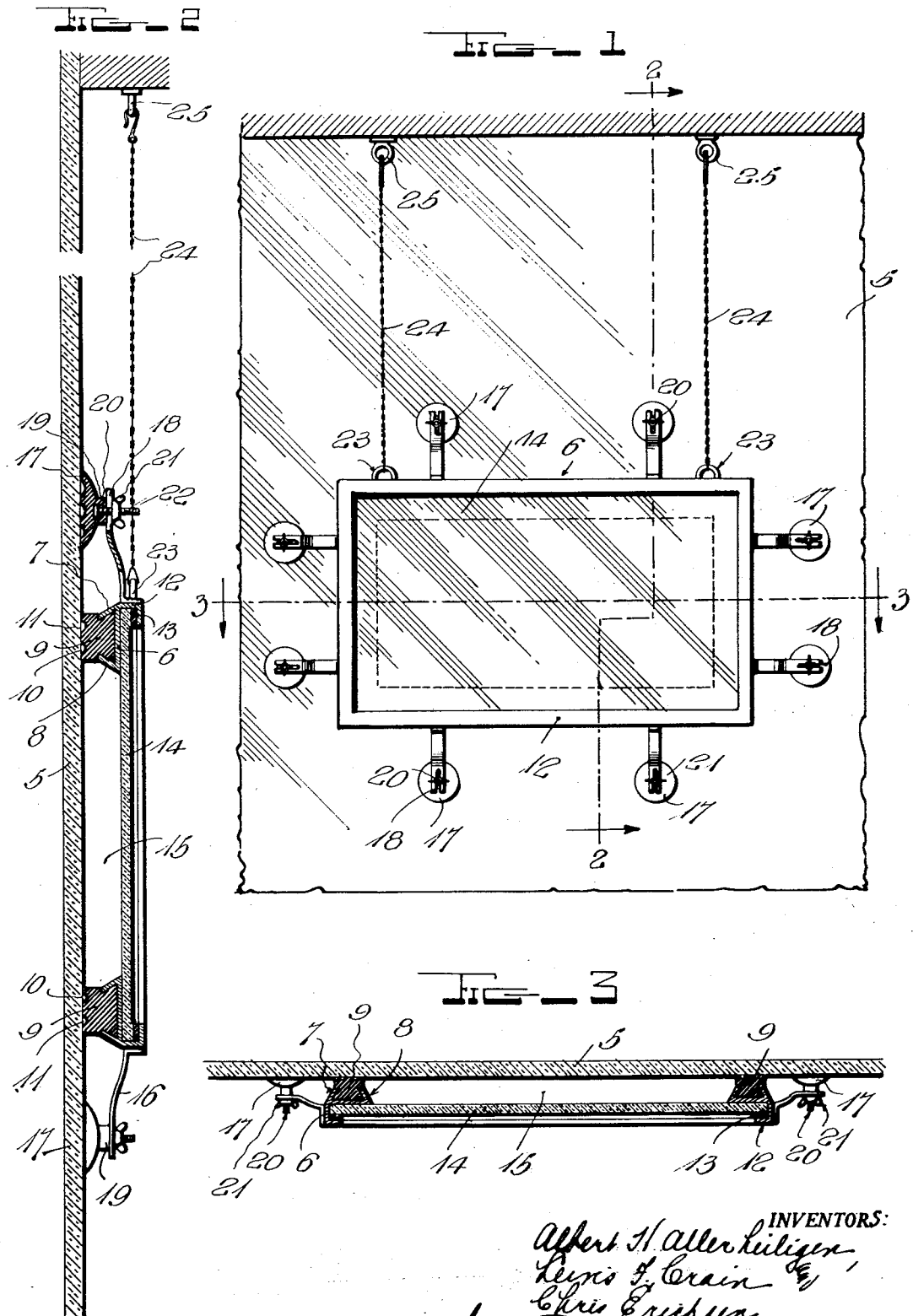

1,679,802

UNITED STATES PATENT OFFICE.

ALBERT H. ALLERHEILIGEN, LEWIS F. CRAIN, AND CHRIS ERICHSEN, OF MISSOURI VALLEY, IOWA.

FROST-PROOF GUARD.

Application filed January 25, 1928. Serial No. 249,335.

This invention relates to guards for transparent plates, such as glass used as windshields for automobiles or as glazing for store windows, locomotive engines, street car windows, aeroplanes or airships. In the further description of the invention, it will be referred to as being used in association with a transparent element or plate of glass and by this reference, the inventors desire to convey the information that the invention is of utility in any association where visibility is desired through an object which may become fouled through the accumulation of frost, steam, or deposits, such as rain or sleet.

It is a further object of this invention to produce a protector for a section of the inside of a plate of glass that will prevent moisture from gaining access to the protected area and it will also prevent frosting of the glass, or the accumulation of moisture on the inner surface of the plate of glass, due to condensation, thereby making it possible with the use of this protector to maintain a clear vision through the glass of a windshield or a show or store window.

It is a still further object of this invention to produce a protector of the character indicated, capable of turning of water as it descends on the side of a plate of glass, and directing such water transversely of the protector in order that the said water may descend thereafter without fouling that part of the plate of glass occupied or guarded by the protector.

It is a still further object of this invention to produce a protector of the character indicated having novel means by which it will be held in such close engagement with the plate of glass as to prevent access of water between the plate of glass and the parts of the protector that contact with it.

It is furthermore an object of this invention to produce a device of the character indicated which is simple in construction and comparatively inexpensive to produce and maintain.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of a fragment of a plate of glass showing a device embodying the invention applied thereto;

Figure 2 illustrates a sectional view on the line 2—2 of Fig. 1; and

Figure 3 illustrates a sectional view on the line 3—3 of Fig. 1.

In these drawings, 5 denotes the plate of glass, such as the glass of a windshield of an automobile or of a window, an area of which is to be protected through the production of a dead air space on its inner surface, as will presently appear.

The protector, in the present embodiment of the invention, comprises a frame 6 having a dovetailed channel formed by the converging flanges 7 and 8, and these channels are intended as anchorages for a cushion or yieldable rail 9 that is yieldable to be pressed closely against the inner surface of the plate of glass. Preferably, the cushion has longitudinally extending channels 10 and 11 and the cushion is preferably made of rubber so that the channels break the contacting surface of the cushion and three rows of contact are thus produced, which permits the cushion to be more firmly seated against the glass.

The frame has an L-shaped flange 12 preferably integral with it, and the portion of the flange that is parallel with the frame is engaged by a packing strip 13, which packing strip lies back of the last mentioned portion of the flange in engagement with a transparent plate 14 of glass, celluloid, or the like, it being seen that the plate 14 rests on the frame and it is held seated by the packing strip 13 so that a practically airtight joint is formed between the plate 14 and the frame in order that air may not circulate through the joint to the dead air space 15 which would be enclosed by the device when properly secured to the glass of a windshield or to a window glass.

In order to hold the cushions in firm contact with the glass 5, the frame has a number of arms 16 secured to it, the said arms projecting outwardly from the frame a suitable distance to produce a clearance for the suction cups 17 that are intended to be pressed against the glass for the purpose of anchoring the device to the glass in forming an air-tight joint between the cushions and the glass. Each arm is preferably provided with a slot 18 in order that the suction cups may be adjusted with relation to the cushions, and, in the present embodiment of the invention, each suction cup has a head 19 and a portion of a shank 20 anchored in it, the said shank being adapted to project into a slot of an arm where it is adjustably secured by a fastening 21, such as a wing nut, engaging the threads 22 of the shank.

By advancing the nut 21 so that it clamps the arm between the nut and the end of the suction cup, the parts will be retained in their adjusted positions, whereas by backing the nut, the suction cup will be released for an adjustment, as will be understood.

In order to relieve the suction cups of the weight of the guard or device and permit them to operate successfully for holding the cushions in contact with the glass, the suspending means for the device or protector may be supplied, and, in this embodiment of the invention, the frame has eyes or loops 23 connected by chains or other suspending elements 24 to eyes or brackets 25 that are anchored to the window frame or other stationary object.

As the functions of the several elements have been described in connection with a description of the several parts of the device, a résumé of the operation of the device as a whole is believed unnecessary for an understanding of the invention by one skilled in the art.

We claim:

In a frost-proof guard, a frame having dovetailed grooves on its sides, cushions anchored in the grooves and adapted to be forced into engagement with a plate of glass, an L-shaped flange carried by the frame, a transparent plate embraced by said flange, a packing strip interposed between a portion of the flange and the said plate, arms projecting from the frame, said arms having slotted ends, suction cups, threaded shanks anchored to the suction cups and projecting into the slots, and nuts threaded on the shanks for binding the suction cups and arms together.

ALBERT H. ALLERHEILIGEN.
CHRIS ERICHSEN.
LEWIS F. CRAIN.